United States Patent

[11] 3,611,224

| | | |
|---|---|---|
| [72] | Inventor | Hans Ludwig Becker<br>Darmstadt, Germany |
| [21] | Appl. No. | 755,239 |
| [22] | Filed | Aug. 26, 1968 |
| [45] | Patented | Oct. 5, 1971 |
| [73] | Assignee | Licentia, Patent-Verwaltungs-G.m.b.H.<br>Frankfurt am Main, Germany |
| [32] | Priority | Aug. 24, 1967 |
| [33] | | Germany |
| [31] | | P 16 38 407.9 |

[54] CONTROLLABLE REACTIVE CURRENT GENERATOR
18 Claims, 27 Drawing Figs.

[52] U.S. Cl. .................................................. 336/5,
323/48, 323/56, 323/60, 336/170, 336/214
[51] Int. Cl. ..................................................... H01f 33/00
[50] Field of Search ........................................... 336/5, 12,
150, 170, 180, 181, 214; 323/44, 48, 49, 60, 61,
83, 56, 89; 321/9, 57, 68

[56] References Cited
UNITED STATES PATENTS
| | | | |
|---|---|---|---|
| 3,217,231 | 11/1965 | Duncan et al. ................ | 336/5 X |
| 3,264,549 | 8/1966 | Biringer ........................ | 321/68 |
| 3,467,930 | 9/1969 | Glover ......................... | 336/180 X |

FOREIGN PATENTS
| | | | |
|---|---|---|---|
| 525,384 | 8/1940 | Great Britain ................ | 323/89 |

*Primary Examiner*—Gerald Goldberg
*Attorney*—Spencer & Kaye

ABSTRACT: Apparatus, containing no moving parts, for generating controllable sinusoidal reactive currents in an *n*-phase mains. The apparatus includes a primary winding, connected to each phase of the mains, having 2*n* windings which are associated, in groups of two, with each respective phase of mains. The apparatus also includes either the second one alone or both of the following two auxiliary windings: (1) a delta-connected alternating current winding having 2*n* windings which are connected serially in groups of two, each group being associated with a respective phase of the mains, and (2) a direct current winding also having 2*n* windings which are connected serially, in groups of two with each group being associated with a respective phase of the mains. The two windings in each group of the direct current winding are wound in opposition. Each of the windings of the primary winding excites a separate magnetic circuit which contains respective the one of the windings of the auxiliary winding or windings.

Inventor:
Hans Ludwig Becker
By: Spencer & Kaye
Attorneys

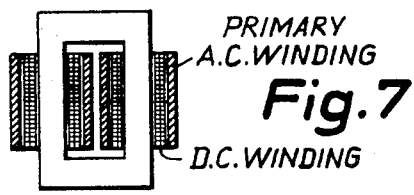
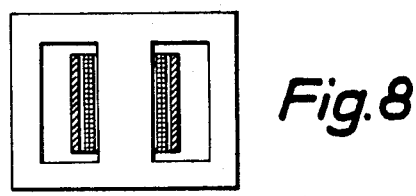
Fig.7 — PRIMARY A.C. WINDING / D.C. WINDING
Fig.8
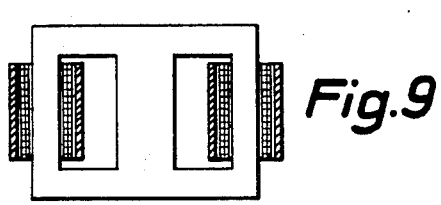
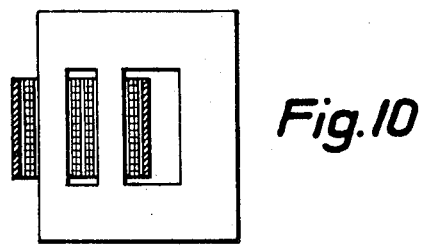
Fig.9
Fig.10
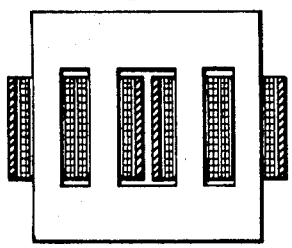
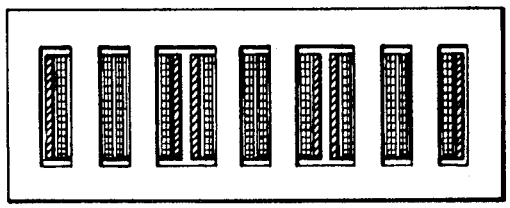
Fig.11
Fig.13
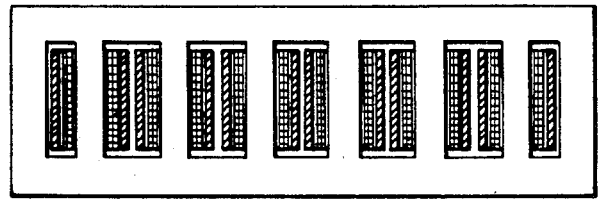
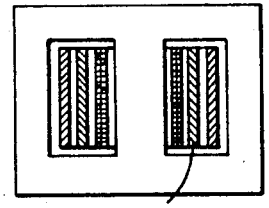
Fig.12
Fig.14 — DELTA WINDING
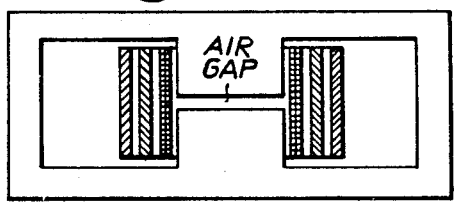
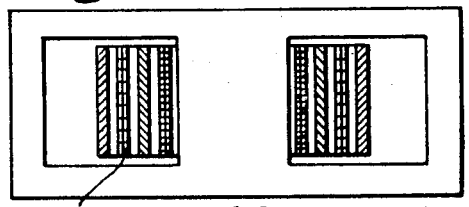
Fig.15 — AIR GAP
Fig.16 — SECONDARY (TRANSFORMER) WINDING PRIMARY WINDINGS OF A SET OF THREE C.R.C. GENERATORS, TWO OF THEM IN ZIG ZAG OR INTERCONNECTED STAR CONNECTION Inventor:
Hans Ludwig Becker
By: Spencer & Kaye
Attorneys

β=0°

β=30°

β = 60°

β = 80°

β = 90°

β = 120°

CONTROLLABLE REACTIVE CURRENT GENERATOR

BACKGROUND OF THE INVENTION

The present invention relates to a static device for generating controllable sinusoidal reactive currents in polyphase mains.

It is often necessary to provide electrical networks with reactive current compensation. However, the capacitive currents which arise in high voltage or cable mains are often of such large orders of magnitude that the usual prior art means of compensation become very expensive.

A great number of static devices for producing reactive power in AC power mains are known in the art. In one case, for instance, the mains are provided with a harmonic-free choke coil having a direct current produced magnetization bias. Every limb of the core of this device, which is laminated in the usual manner, is subdivided into four partial limbs by slots running both transverse to and longitudinally with the plane of laminations. Since the construction of this kind of choke coil is quite expensive, this solution has not found extensive acceptance in the electrical machinery art.

A reactive power generator has also become known which starts from the same principle but provides common windings for the biasing direct current and the auxiliary alternating current required to compensate the harmonics, for every phase of the polyphase system. However, this device also requires four limbs per phase.

This kind of expense is only justified when it is absolutely necessary to avoid the fifth and seventh harmonic for every condition of operation; that is, with every condition of magnetization bias. This is a requirement only when the mains, with which the compensating equipment is used, is susceptible to resonance at these harmonic frequencies. Since this is normally not the case, a simpler construction, which more closely corresponds to the conventional type of transformer structure, will usually suffice. It is this type of construction which is the subject of the present invention.

It is also not reasonable to support the expense of this prior art equipment when the attendant compensation is only effective with symmetrically loaded power systems. In these cases, whenever a failure occurs in the mains (e.g., by a short circuit or an interruption in one or more phases) and causes unsymmetrical voltages to be applied to the equipment, the damaging harmonics in the primary current may nevertheless occur.

SUMMARY OF THE INVENTION

An object of the present invention, therefore, is to provide apparatus for the static generation of reactive power which will suppress certain harmonics yet utilize the principles of conventional transformer construction.

It is also an object of the present invention to provide transformer type apparatus for generating reactive power which require the fewest possible turns in the transformer core and the lowest possible material expense.

These objects, as well as other objects which will become apparent in the discussion that follows, are achieved, according to the present invention, by providing a primary winding in combination with one or two auxiliary windings in the following manner: The primary winding, which is connectable to each phase of an $n$-phase mains, is provided with $2n$ first windings which are associated, in groups of two, with each respective phase of the mains, and each of which excites a separate magnetic circuit which contains either one or two associated auxiliary windings. These auxiliary windings consist of a delta-connected alternating current winding, which may or may not be present, for influencing the harmonic content of the reactive current having $2n$ second windings which are connected serially in groups of two, each group being associated with a respective phase of the mains, and/or a direct current winding (always present) connectable to a source of direct current and having $2n$ third windings which are connected in groups of two with the two windings in each group being connected in series opposition, and each group being associated with a respective phase of the mains.

In the case of three-phase current, therefore, it is necessary to provide only six wound cores which can be supplied with the three-phase voltage and provided with a magnetization bias. The magnetization bias will then have the effect of doubling the number of magnetic circuits.

Now a static apparatus for doubling the frequency of polyphase current has already been suggested. This arrangement employs the concept of using two separate magnetic paths for each phase of the mains supply. However, this arrangement is concerned with the generation of, not the problem of damping, the harmonics.

In a preferred embodiment of the present invention the two first windings in every phase of the primary winding are connected in series. The primary winding can, in this case, be connected either in star or in delta. When connected in star the apparatus should preferably include the delta alternating current winding to compensate for certain harmonics, as will be explained in greater detail below. The DC winding, in both of these cases, should have its groups of third windings connected in parallel to a source of direct current.

According to another preferred embodiment of the present invention, the two first windings in each group of the primary winding are connected in parallel and the individual groups connected in star or delta. In this case the DC winding can be connected in the manner of an open polygon to a source of direct current. The direct current may be obtained from the polyphase mains, for example, by employing a rectifier bridge.

BRIEF DESCRIPTION OF THE DRAWINGS

FIG. 7 is a schematic illustration of the construction of a core which may be employed with one or more of the winding arrangements according to the present invention.

FIG. 8 is a schematic illustration of the construction of a core which may be employed with one or more of the winding arrangements according to the present invention.

FIG. 9 is a schematic illustration of the construction of a core which may be employed with one or more of the winding arrangements according to the present invention.

FIG. 10 is a schematic illustration of the construction of a core which may be employed with one or more of the winding arrangements according to the present invention.

FIG. 11 is a schematic illustration of the construction of a core which may be employed with one or more of the winding arrangements according to the present invention.

FIG 12 is a schematic illustration of the construction of a core which may be employed with one or more of the winding arrangements according to the present invention.

FIG. 13 is a schematic illustration of the construction of a core which may be employed with one or more of the winding arrangements according to the present invention.

FIG. 14 is a schematic illustration of the construction of a core which may be employed with one or more of the winding arrangements according to the present invention.

FIG. 15 is a schematic illustration of the construction of a core which may be employed with one or more of the winding arrangements according to the present invention.

FIG. 16 is a schematic illustration of the construction of a core which may be employed with one or more of the winding arrangements according to the present invention.

DESCRIPTION OF THE PREFERRED EMBODIMENTS

FIGS. 1 to 6 illustrate various winding arrangements which may be used with the static reactive current generator according to the present invention. It will be assumed, with these embodiments, that all the windings as well as the choke coils have the same number of turns. This simplifying assumption, however, is not intended to limit the present invention to these special cases. As will be noted below, each figure may illustrate one or more embodiments of the reactive current generator.

Embodiment 1l

Figure 1:
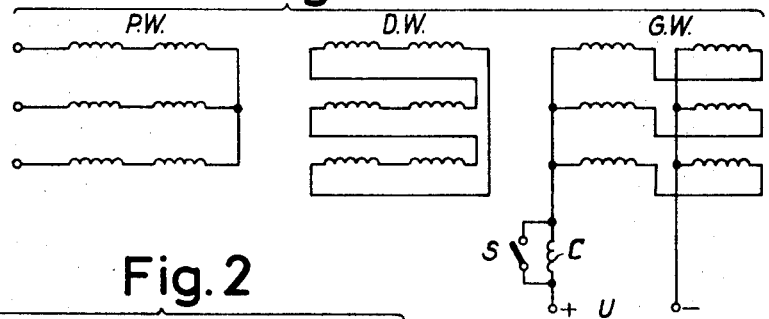
FIG. 1 is a schematic diagram of the winding arrangement of a static reactive current generator according to one preferred embodiment of the present invention.

The fist winding arrangement, according to the present invention, is illustrated in FIG. 1. The primary winding PW is internally connected in star and externally connected to the three phases of the three-phase mains. Next to the primary winding is arranged a delta-connected or "delta winding" DW and a star-connected DC winding GW. In the DC winding, the two windings which belong to the same phase are connected in series with the opposite polarity (series opposition) and all the phases are connected in parallel. A DC magnetization bias voltage U is applied to this winding as shown.

Embodiment to a particular modification of the winding arrangements according to the present invention, a choke coil may be connected either in the primary circuit, in circuit with the the winding, or in the DC circuit to further assist in eliminating the current harmonics. In the Embodiment 1, shown in FIG. 1; this choke coil C lies in the DC circuit and is designed so that its magnetic permeance will be four times the magnetic permeance of a saturated core interlinked with the DC winding. A shunt switch S is arranged in parallel with the choke coil C.

The magnetic potential with this embodiment exhibits the following harmonics and hence currents in the various windings:
PW: $\nu_1=1,5,7...$; DW: $\nu_3=3,9,15...$; GW: $\nu_0=0,6,12...$ and $\nu_2=2,4,8$, wherein $\nu_0$, $\nu_1$, $\nu_2$, and $\nu_3$ represent groups or series of harmonics with the subscript representing the harmonic of the lowest ordinal within each group. In the group $\nu_0$ the ordinal 0 harmonic indicates the DC component of the magnetic potential caused by the DC current in the winding GW.

Embodiment 2

Figure 2:
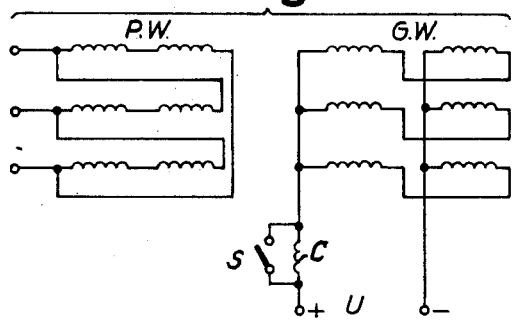
FIG. 2 is a schematic diagram of the winding arrangement of a static reactive current generator according to a second preferred embodiment of the present invention.

FIG. 2 illustrates another preferred embodiment of the present invention. The primary winding PW is connected in delta. The DC winding GW is in star-connection (three phase parallel) with the DC voltage applied to its two star center points. A linear choke coil C bridged by a shunting switch S may be connected in series with the DC voltage source. This coil is so dimensioned that its magnetic permeance will be four times the magnetic permeance of saturated core interlinked with the DC winding plus two times the permeance per core additionally interlinked with the mains connected primary winding.

The following magnetic potential harmonics will occur with this embodiment:
PW: $\nu_1=1,5,7...$; $\nu_3=3,9,15...$; GW: $\nu_0=0,6,12...$; $\nu_2=2,4,8...$

Embodiment 3

Embodiment 3 is a modification of Embodiment 1 illustrated in FIG. 1. This arrangement consists only of the primary winding PW and the DC winding GW; the delta winding DW as well as the coil C and the switch S of the embodiment of FIG. 1 are removed.

The magnetic potential for the primary winding PW is $\nu_1=1,5,7...$ ($\nu_3=3,9,15...$ is suppressed). For the DC winding GW: $\nu_0=0,6,12...$ and $\nu_2=2,4,8...$

Embodiment 4

Figure 3:
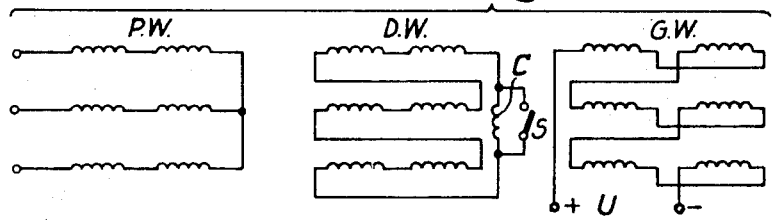
FIG. 3 is a schematic diagram of the winding arrangement of a static reactive current generator according to a third preferred embodiment of the present invention.

The Embodiment 4 is illustrated in FIG. 3. The primary winding PW supplied by the mains is connected in star. The arrangement includes a delta winding DW and a DC winding GW. The two windings of each phase of the DC winding are connected in series opposition and the phases are connected in an open delta (three phases in series). The DC voltage is connected to the two ends of this open delta.

The delta winding circuit can be closed through a linear choke coil C which, in turn, may be shunted by a switch S. This coil is dimensioned according to the rule that its permeance be 12 times the magnetic permeance of a saturated core interlinked with the DC winding.

The magnetic potential harmonics:
PW: $\nu_1=1,5,7...$; DW: $\nu_3=3,9,15...$; GW: $\nu_0=0,6,12...$
The second harmonic along with the fourth, eighth, etc., is suppressed.

Embodiment 5

Figure 4:
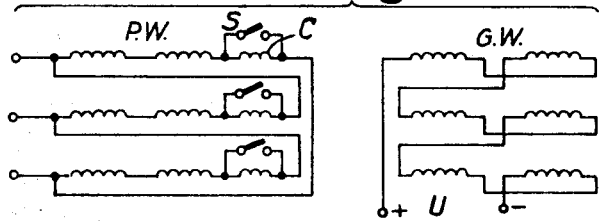
FIG. 4 is a schematic diagram of the winding arrangement of a static reactive current generator according to a fourth preferred embodiment of the present invention.

FIG. 4 illustrates the fifth embodiment of the reactive power generator according to the present invention. The primary winding PW is connected in delta. A coil C, bridged by a switch S, can lie in the path of the winding PW in each of the phases. The DC winding GW is connected in the same way as in Embodiment 4, shown in FIG. 3. In this case, the permeance values of the choke coils are made four times the permeance of a saturated core interlinked with the DC winding reduced by twice the permeance per core additionally interlinked with the mains connected primary winding.

The following magnetic potential harmonics will be produced:
PW: $\nu_1=1,5,7...$; $\nu_3=3,9,15...$; GW: $\nu_0=0,6,12...$
The second harmonic is likewise suppressed with the fourth, eighth, etc.

Embodiment 6

Embodiment 6 is similar to the Embodiment 4 illustrated in FIG. 3; however, in Embodiment 6 the delta winding DW with the coil C and the switch S is removed.

The overtone spectrum appears as follows:
PW: $\nu_1=1,5,7...$; GW: $\nu_0=0,6,12...$
Here both the second and third harmonic, along with those dependent thereon, are suppressed.

Instead of using the star-connection for the primary windings in Embodiments 1, 3, 4 and 6, it is also possible to employ a zigzag or interconnected star-connection.

The embodiments described above are all arranged so that the two cores on the AC side which belong to a single phase are connected in series. It is also possible to connect these two cores in parallel. Since, in this case, the even numbered harmonics will be able to flow within this parallel circuit, it is possible to do without a star connected DC winding and connect this winding in delta as in the Embodiments 4, 5 and 6.

With this type of arrangement the following embodiments are possible:

Embodiment 7

Figure 5:
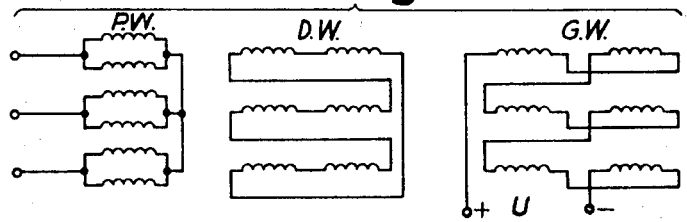
FIG. 5 is a schematic diagram of the winding arrangement of a static reactive current generator according to a fifth preferred embodiment of the present invention.

FIG. 5 illustrates Embodiment 7. Here the primary winding PW, which is supplied by the mains, is connected in star. This circuit includes a delta winding DW having the windings belonging to each phase connected either in parallel, or in series, as shown. The DC winding GW is also connected in delta. The DC voltage supply U lies in the path of this delta circuit.

The magnetic potential harmonics are distributed on the windings as follows:

PW: $\nu_1=1,5,7...$; $\nu_2=2,4,8...$; DW: $\nu_3=3,9,15...$; GW: $\nu_0=0,6,12...$

Embodiment 8

Figure 6:
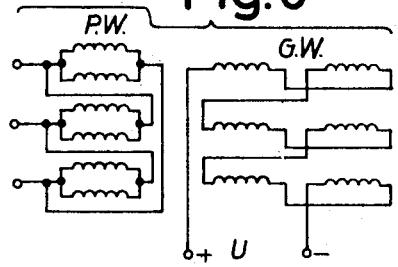
FIG. 6 is a schematic diagram of the winding arrangement of a static reactive current generator according to a sixth preferred embodiment of the present invention.

FIG. 6 illustrates the winding arrangement for this embodiment of the present invention. The primary winding PW is connected in delta and the DC winding GW connected as in Embodiment 7, FIG. 5. The following harmonics may be found in the overtone spectrum:

PW: $\nu_1=1,5,7...$; $\nu_2=2,4,8...$; $\nu_3=3,9,15...$; GW: $\nu_0=0,6,12...$

Embodiment 9

Embodiment 9 is similar to the Embodiment 7 illustrated in FIG. 5; however, in Embodiment 9 the delta winding DW is removed. As a result of the suppression of the third harmonics and those dependent thereon, the magnetic potential includes the following overtones:

PW: $\nu_1=1,5,7...$; $\nu_2=2,4,8...$; GW: $\nu_0=0,6,12...$

Instead of the star-connection in the primary winding in the Embodiments 7 and 9, it is also possible to employ a zigzag or interconnected star-connection.

In the Embodiments 1, 2 and 3, the harmonics $\nu_2=2,4,8...$ add together to equal zero at the star center points of the DC winding. Therefore, only the harmonics $\nu_0=0,6,12...$ flow through the DC voltage source.

In Embodiments 2, 5 and 8 the harmonics $\nu_3=3,9,15...$ flow as circular currents in the primary delta winding. Therefore, only the harmonics $\nu_1=1,5,7...$ appear in the mains current.

In the embodiments 7, 8 and 9 the harmonics $\nu_2=2,4,8...$ flow as circular currents within the parallel connected primary windings of each phase.

CORE CONSTRUCTION

The six magnetic circuits required in each of the nine embodiments described above can be constructed as six cores in the manner known in the art. FIGS. 7–13, which will now be discussed, illustrate several possible types of cores which may be used. In these figures, the singly hatched sections designate the delta windings, in cross section, while the crosshatched sections designate the DC windings.

FIG. 7 shows a core, constructed in double limb configuration; either one or both of the limbs can carry the windings. FIG. 8 shows a three-limb core. Here, the central limb can carry the windings while the outer limbs serve as return paths for the magnetic flux.

In these arrangements of FIGS. 7 and 8, six such cores are required to make a single core unit. This construction may be employed as the core in each of the nine embodiments described above.

FIG. 9 shows a three-limb core in which the two outer limbs carry the windings associated with two of the cores of the type shown in FIGS. 7 and 8. The central limb serves as a return path either for the alternating flux or for the constant flux produced by the DC winding.

FIG. 10 shows an arrangement in which the wound limbs are combined. Each of the DC windings is passed around one of the half limbs. The common alternating current winding surrounds both of the half limbs while the remaining limb serves as a return flux path.

In FIG. 11 the return limb is likewise divided and carries the respective windings.

Every three cores constructed in the manner shown in FIGS 9, 10 and 11 form a polyphase unit. The core configurations according to these three figures can be employed in the Embodiments 1 to 6 while the core configuration of FIG. 9 can also be employed in the Embodiments 7 to 9.

FIG. 12 illustrates an eight-limb core. The two outer limbs serve as a return flux path. The six central limbs carry the respective windings so that every two adjacent limbs will be provided with bias magnetization in opposite directions. This core configuration, which forms a complete polyphase unit, can be employed with every winding embodiment described above.

In FIG. 13 every two of the oppositely biased partial limbs are combined and carry a common alternating current winding. This configuration can be used with the Embodiments 1 to 6.

If the return path limbs be eliminated from the cores of FIGS. 12 and 13, these cores may be employed with the embodiments having a delta winding. Thus, the core configuration according to FIG. 12 may be utilized with the Embodiments 1, 2, 4, 5, 7 and 8 while the core configuration according to FIG. 13 may be utilized with the Embodiments 1, 2, 4 and 5.

The particular winding arrangement illustrated with the FIGS. 7 to 13 corresponds to that of Embodiment 2, which comprises one alternating current and one direct current winding. Additional delta or secondary windings may be arranged in a manner corresponding to that of the alternating current winding.

FIG. 14 shows a winding arrangement corresponding to Embodiment 1, which comprises one alternating current, one direct current, and one delta winding. The principle shown in FIG. 14 can, of course, be applied to all cores shown. It should be noted that, for minimum losses, the delta winding is placed between the DC and the primary windings.

EXTERNAL CIRCUIT CONNECTIONS

The controllable DC or biasing winding is provided with a DC voltage source of any type well known in the art. This source may, for example, be of the type employed for the excitation of phase-changers. The excitation may be automatically controlled by suitable control circuits in dependence upon voltage, current · cos Φ and real and reactive power so that a change in one or more of these values will result in an automatic regulation. Suitably dimensioned excitation pulses can also be applied to improve a dynamic behavior of the controllable reactive current generator.

The individual cores may be provided with one or more airgaps to produce the "combination" of a linear choke coil with the controllable reactive current generator. One such core is shown in FIG. 15, having one air gap in the center limb of the core. The arrangement of the windings corresponds to that of FIG. 14.

If a plurality of reactive current generating units of the type described above must be employed on a single mains it is possible, in addition, to utilize the fact that harmonics of the order $\nu_5=5, 7, 17, 19........$ will drop out of the common primary current of two such units, if the fundamental sinusoidal fluxes in the two cores have the same amplitudes and are displaced in phase by 30°. These possibilities arise with the Embodiments 1 and 2, or 4 and 5 or 7 and 8. The common mains current of such a combination will then contain only the harmonics of the order $\nu_{11}=11, 13, 23, 25....$ if the bias magnetization is the same for both units and the individual groups of harmonics are met with approximately the same conditions. Using the same assumptions it is possible to join three or more units into a single group by providing them with corresponding primary windings which effect, for $n$ units a respective phase shift of $60°/n$. This can be achieved, for example, by a corresponding zigzag or interconnected star-connection.

Figure 17:
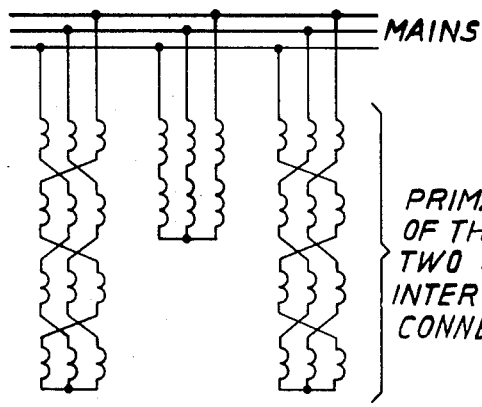
FIG. 17 is a schematic illustration of the connection of the primary AC windings of three c.r.c. generators two of which are connected in zigzag or interconnected star connection according to the present invention.

One such winding arrangement is shown in FIG. 17 for three units. Two of the primary windings are connected in zigzag or interconnected star-connections which results in a 20° phase shift between the three primary windings.

Figure 18:
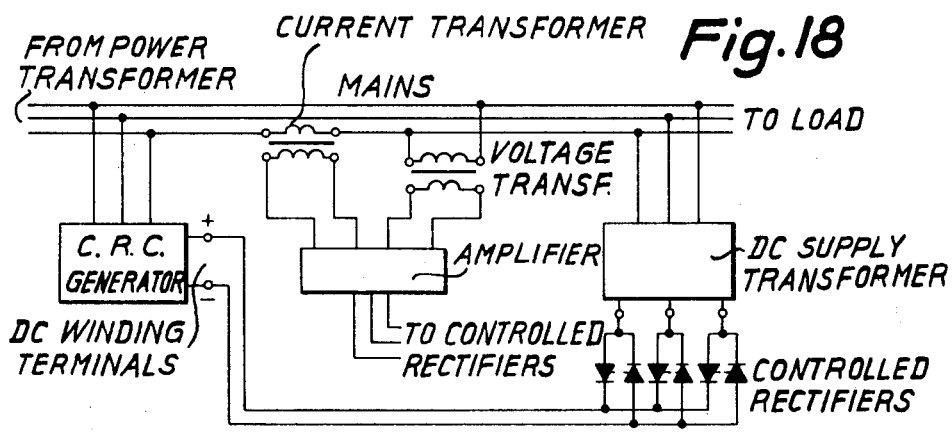
FIG. 18 is a schematic illustration of a c.r.c. generator the DC excitation of which is automatically controlled by the load conditions in the mains according to the present invention.

FIG. 18 shows how a reactive current generator can be controlled automatically by the load of the system into which the reactive current generator is feeding. A DC supply transformer connected to the mains in turn feeds direct current into the c.r.c. generator through controlled rectifiers connected to the secondary winding terminals of the transformer. The rectifier control signal is taken from current and voltage transformers connected to the mains that is to be supplied with reactive power, and fed to the rectifiers over an amplifier. Thus, the operation of the c.r.c. generator is directly and automatically controlled by the system load. FIG. 18 shows, of course, but one possible embodiment for automatic c.r.c. generator control according to the invention.

All the units described above can, through the addition of one or more supplementary windings, be turned into a transformer which can serve to distribute energy and compensate capacitive current at the same time. FIG. 16 shows how a secondary winding can simply be added to turn the controllable reactive current generator into a combination for general transformer and reactive current generator use. It should be noted that, for maximum efficiency, the windings should be arranged in the following order: DC winding, delta winding, secondary (transformer) winding, and primary winding, see FIG. 16, with the DC winding next to the core and the primary winding on top of the others.

The controllable reactive current generator can be connected directly to the mains and remain connected to the mains even when the transformer is switched off. Of course, it can also be connected to a corresponding tertiary winding of a high voltage transformer.

Figure 19:
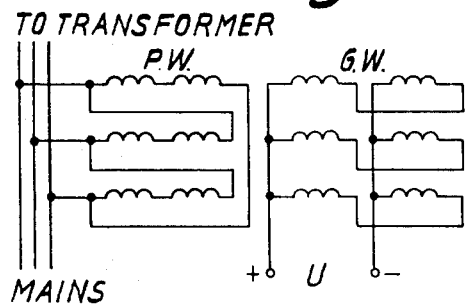
FIG. 19 is a schematic illustration of how a controllable reactive current (c.r.c.) generator is connected directly to the mains according to the present invention.

FIG. 19 shows a controllable reactive current generator which is connected directly to the mains.

Figure 20:
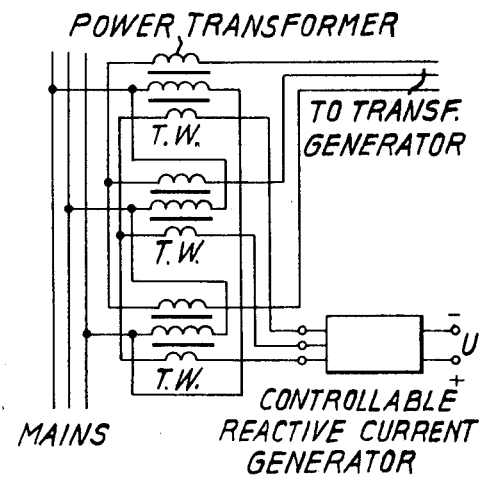
FIG. 20 is a schematic illustration of how a c.r.c. generator is connected to the mains over a tertiary winding (T.W.) of a power transformer according to the present invention.

A power transformer, FIG. 20, having tertiary windings T.W. receives its power from a transformer generator not shown and is connected to the controllable reactive current generator over its tertiary windings. The tertiary winding is used simply to avoid that the c.r.c. generator has to be designed for high voltages.

Parallel capacitor batteries may be regulated with the aid of the controllable reactive current generator without requiring the complicated and expensive switching apparatus which was necessary in the prior art. The capacitor battery can either be connected to a tertiary winding of a high voltage transformer or to a medium voltage winding of the controllable reactive current generator which may be present or added thereto.

OPERATION

The operation of the reactive current generator according to the present invention will now be described with reference to FIGS. 21-27 which illustrate the flux responses of a typical embodiment; namely, Embodiment 2.

The reactive current arises as a result of the bias magnetization which generates a unidirectional flux that drives the alternating flux into the saturation region. This causes flux peaks or "crests" above the saturation limit which are proportional to the core magnetic potential where the constant of proportionality is the permeance of the saturated core.

By harmonic analysis of the magnetic potential crests it is possible to obtain the individual harmonics of the magnetic potential. These harmonics may be subdivided into the already noted groups and are distributed among the individual windings of the various embodiments in the manner already described. In the Embodiments 1, 2, 7 and 8, none of the harmonics are suppressed, i.e., all of the harmonics may flow as currents in the windings whereby the flux of the core remains sinusoidal.

The flux crests produced in the magnetic core consist of sinusoidal crests, since, even when the stray flux is taken into account, the flux curve contains practically no overtones and remains sinusoidal. With an increase in the unidirectional flux the sinusoidal crests become wider and wider and finally form a sinusoidal half-oscillation as illustrated by the upper flux curve in FIG. 21.

When this condition is reached the lower half-wave of the flux extends into the unsaturated region while the upper half extends into the saturated region of the magnetization characteristic. The resulting magnetic potential half-oscillation will contain only the harmonics $\nu=0, 1, 2, 4, 6, 8, 10,...$; that is, no odd overtones. For this condition of magnetization bias the primary current will be sinusoidal.

When the primary current is sinusoidal and magnetic potential consists of a half a sinusoid, the saturation angle of a core $2\beta$ will equal 180°, where $\beta=\omega t$ is that angle at which the reference core leaves the saturated portion of the magnetization characteristic. Now with the Embodiments 1, 2, 7 and 8, a harmonic analysis of the magnetic potential crests shows, in general, that when the saturation angle $2\beta$ becomes larger at constant permeance and the width of the magnetic potential crests increases, the relative overtone content of the primary current will be reduced. This occurs when there is an increase in the direct current (the mean value of the crests). Since, at saturation angles which are greater than $2\beta=180°$, the harmonic content of the primary current will only be minimal, it is advantageous to operate in this region.

Now the magnetic potential of a core is proportional to the flux crests which exceed the saturation limit when the alternating flux is raised by the constant or unidirectional flux. The constant of proportionality is the permeance of the core. The flux maximum lies at $\beta=0$.

Figure 21:
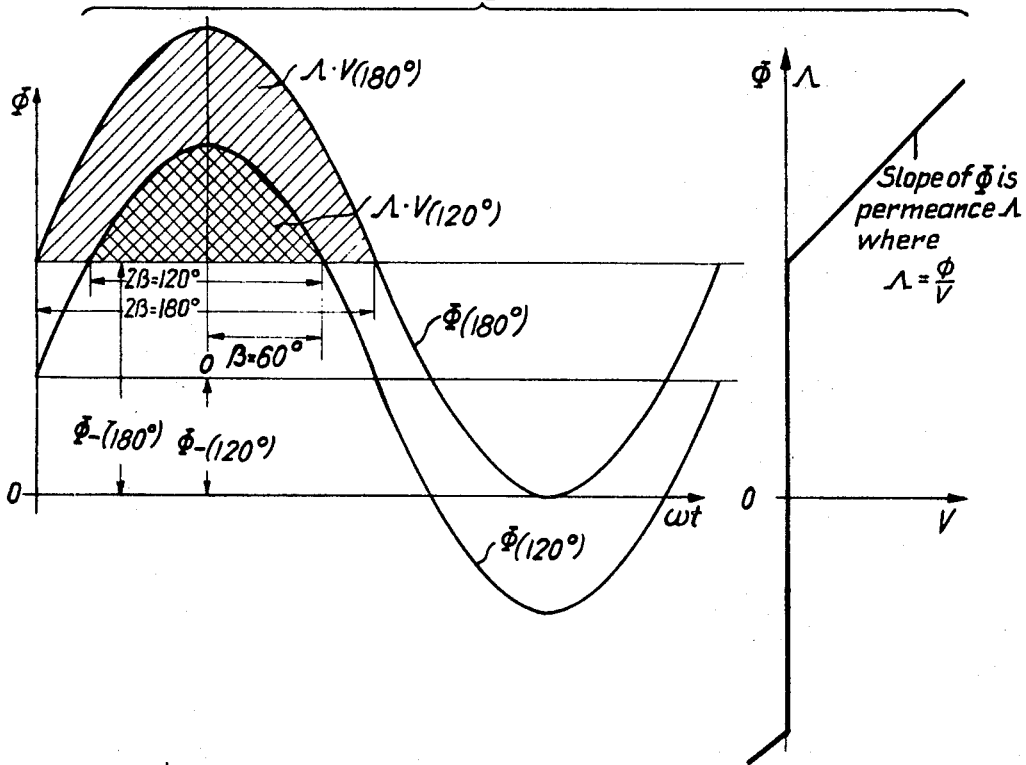
FIG. 21 is a graph illustrating the flux response of the static reactive current generator according to the present invention.

FIG. 21 is a diagram of the flux characteristic $\Phi_{(180°)}$ when beta equals 90° and the flux characteristic $\Phi_{(120°)}$ when $\beta=60°$ for the reactive current generator of Embodiment 2. As may be seen, $\beta$ is half the angular region during which the core is in saturation.

The right hand portion of FIG. 21 shows the magnetic characteristic of the core material. The flux $\Phi$ is drawn over the magnetic potential V and the curve shows a sharp edge at the point where, for correspondingly high values of the flux, saturation begins.

It should be noted that the slope of the flux curve in its saturated region represents the permeance of the saturated core which is linked with the DC winding.

In comparison, the left hand portion of FIG. 21 shows the flux curves $\phi_{(180°)}$ and $\phi_{(120°)}$. For the first curve the saturation angle is 90° ($2\beta=180°$) and its unidirectional portion, flux $\phi_{-(180°)}$, is just as high as is marked by the sharp edge in the magnetic characteristic of the right hand portion of the same figure. For a smaller DC excitation, the unidirectional portion of the flux $\phi_{(120°)}$, is considerably smaller, $(\phi_{-(120°)})$, and its magnetic potential crest $\Delta x V_{(120°)}$ is also smaller than the one corresponding to a larger saturation angle. This angle is 60° for the latter curve as was mentioned before and can easily be seen in FIG. 21, and the magnetic potential crest for the flux curve with higher DC excitation is $\Delta x V_{(180°)}$.

It may be shown by calculation that the reactive current generator is most efficient in the region $\beta=45°-135°$ (in particular, at $\beta=90°$). In this region, the sum of all the currents, taken relative to the generated reactive current, is at a minimum; that is, $$\Sigma i \cong 2$$

Ignoring the fact that a double quantity of windings are used, this sum is representative of the expenditure in copper for a normal transformer.

For smaller values of $\beta$ the efficiency is poor because the harmonics are relatively strong; for larger angles of $\beta$ the direct current is relatively large.

The reactive current generator, according to the present invention, can therefore be dimensioned according to the following rule: The dimensions of the core and the data (e.g. number of turns) of the primary winding, delta winding and DC winding are so adjusted with respect to each other that the interlinked permeance of the DC winding at core saturation, and the additional stray permeance interlinked with the primary winding, make the fundamental oscillation of the primary flux, which is determined in value by the mains voltage applied to the primary winding, exceed the magnetic saturation limit in the region of the time intervals from approximately $\omega t_1$ to approximately $\omega t_2$, for a particular desired primary rated current (fundamental oscillation of the magnetic potential) and, thus, for a certain bias magnetization (mean value of the magnetic potential), where $\omega t_1$ and $\omega t_2$ are given by:

$$(8u+1)\pi/4 \leq \omega t_1 \leq (8u+3)\pi/4$$
$$(8u-1)\pi/4 \leq \omega t_2 \leq (8u+5)\pi/4$$

and $u+0, 1, 2, 3,....$

This is the mathematical expression for the rule mentioned before, namely, that the reactive current generator is most efficient in the region $\beta=45°-135°$.

In the Embodiments 3 and 9 the harmonics $\nu_3=3, 9, 15...$ are suppressed; that is, these harmonics do not develop as currents; instead, the flux and magnetic potential curves are correspondingly deformed. A similar effect occurs in the Embodiments 4 and 5 with the suppression of the harmonics $\nu_2=2, 4, 8,...$ and in the Embodiment 6 with the suppression of the harmonics $\nu_2=2, 4, 8...$ and $\nu_3=3, 9, 15....$ This is due to the fact that all harmonics $\nu_3=3,9,15...$ are suppressed in all connections where there is no AC current carrying winding involved connected in delta, because the third, ninth, 15th ... harmonics can flow only in delta connected windings.

The harmonics $\nu_2=2,4,8$ are suppressed in all connections where the DC windings are connected in series ("open delta") and the two partial primary AC windings of each phase are also connected in series.

In all cases, the magnetic potential characteristics which are formed are so composed of a plurality of phase-displaced crests that the magnetic potentials do not contain the suppressed harmonics; instead, these harmonics appear in the flux and, thus, in the core voltage.

For a particular bias magnetization (direct current) the magnetic potential characteristics or curves have a certain mean value which would also remain the same were the suppressed overtones short-circuited through corresponding imaginary windings so that these overtones could develop as currents in these windings. The magnetic potential would then again consist of a single crest. With such an imaginary short circuit of the harmonics which are suppressed in the real circuits, the then practically sinusoidal flux characteristic, the fundamental oscillation of which would then also here be determined by the mains voltage, should exceed the saturation limit in the same time intervals which have been set forth above. The clearness of definition of the magnetic potential in the region of its mean value will be preserved and the mean value will remain the same in the imaginary circuit as in the real one.

This shall be explained for Embodiment 3 which does not contain a delta winding in reality and no third harmonics and those dependent thereon:

It is imagined that a delta winding would exist which is open and has a closing switch. Such delta winding would then be an "imaginary winding" as mentioned above. By closing the switch and thereby connecting the delta winding into the circuit the magnetic potential would now show a sinusoidal crest within the limits given by the saturation angle $\beta$ and still show the same mean value.

Figure 22:
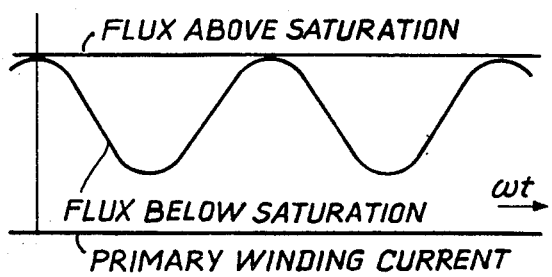
FIGS. 22 to 27 are graphs of the flux response of static reactive current generators, according to the present invention, for various values of $\beta$; where $2\beta$ is the saturation angle of the core.
Figure 23:
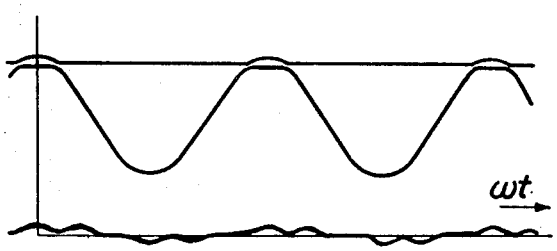
Figure 24:
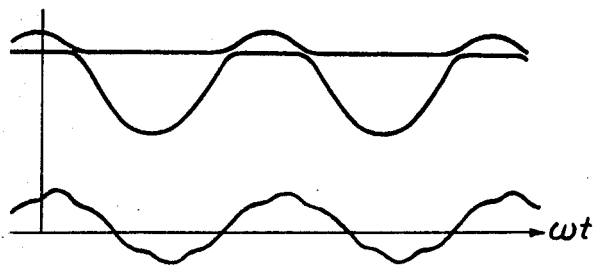
Figure 25:
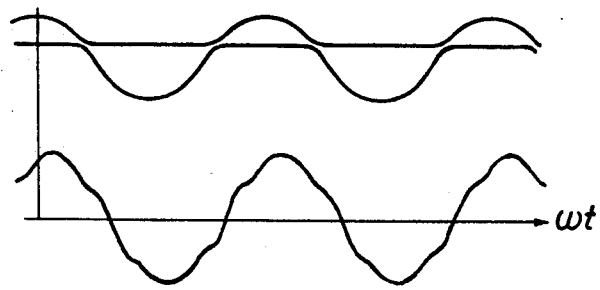
Figure 26:
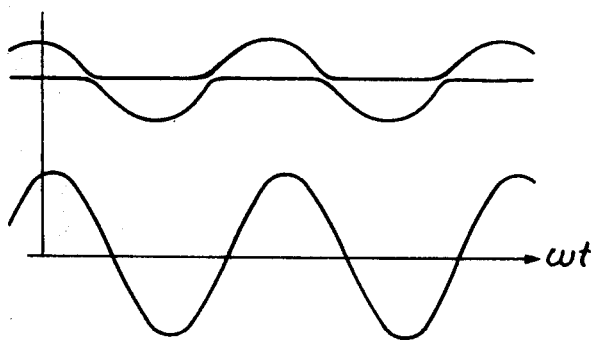
Figure 27:
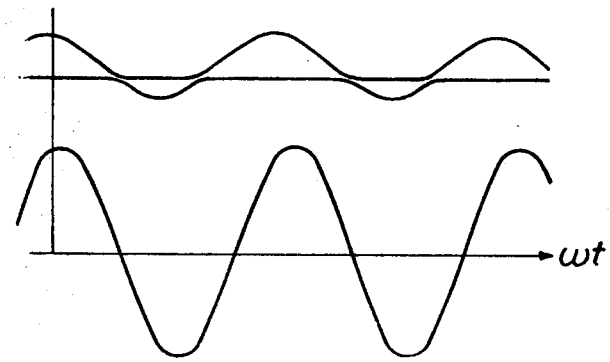

FIGS. 22 to 27 illustrate the operating characteristics of the reactive current generator according to Embodiment 2 of the present invention for various values $\beta$. These characteristics represent, from top to bottom, in each figure the flux above the saturation limit (which equals the magnetic potential times the value of permeance), the flux below the saturation limit, and the current in the primary winding. FIG. 22 shows the case where the saturation half-angle $\beta=0°$. In FIG. 23, $\beta=30°$; FIG. 24 $\beta=60°$; FIG. 25, $\beta=80°$; FIG. 26, $\beta=90°$; and in FIG. 27 $\beta=120°$. The auxiliary choke coil C has not been included in the Embodiment to which these characteristics relate. If such a coil be added to the embodiment and $\beta$ set equal to 60°, for example, the residual distortion in the primary current will disappear entirely, leaving a pure sinusoid.

As may be seen from FIGS. 22 to 27, the reactive current generator according to the present invention is capable of delivering a distortion-free sinusoid to compensate capacitive reactive power.

It will be understood that the above description of the present invention is susceptible to various modifications, changes and adaptations.

I claim:

1. Apparatus for generating controllable sinusoidal reactive currents in an $n$-phase mains comprising, in combination:
   a. a primary winding connected to each phase of said mains, said primary winding having $2n$ first windings, which are associated, in groups of two, with each respective phase of said mains; and
   b. auxiliary winding means including either item (1) at least one and (2) or item (2) alone of the following:
      (1.) a delta-connected alternating current winding for influencing the harmonic content of the reactive current, said alternating current winding having $2n$ second partial windings, which are connected serially in groups of two, each respective group being associated with a respective phase of said mains, and
      (2.) a direct current winding, connectable to a source of direct current, said direct current winding having $2n$ identical second windings which are serially connected in groups of two, each respective group being associated with a respective phase of said mains, the two second windings of each group being wound in opposition,
   each of said first windings exciting a separate magnetic core circuit which contains the respective winding of said auxiliary winding means.

2. The apparatus defined in claim 1, wherein said two first windings in each group of said primary winding are connected in series, wherein said groups of said primary winding are connected in star, and wherein said groups of said direct current winding are connected in parallel, and the parallel circuit, so formed, is connectable to a source of direct current.

3. The apparatus defined in claim 1, wherein said two first windings in each group of said primary winding are connected in series, wherein said groups of said primary winding are connected in delta, and wherein said groups of said direct current winding are connected in parallel, and the parallel circuit, so formed, is connectable to a source of direct current.

4. The apparatus defined in claim 1, wherein said two first windings in each group of said primary winding are connected in series, wherein said groups of said primary winding are connected in star, and wherein said groups of said direct current winding are connected in series, and the series circuit, so formed, is connectable to a source of direct current.

5. The apparatus defined in claim 1, wherein said two first windings in each group of said primary winding are connected in series wherein said groups of said primary winding are connected in delta, and wherein said groups of said direct current winding are connected in series, and the series circuit, so formed, is connectable to a source of direct current.

6. The apparatus defined in claim 1, wherein said two first windings in each group of said primary winding are connected in parallel, wherein said groups of said primary winding are connected in star, and wherein said groups of said direct current winding are connected in series, and the series circuit, so formed, is connectable to a source of direct current.

7. The apparatus defined in claim 1, wherein said two first windings in each group of said primary winding are connected in parallel, wherein said groups of said primary winding are connected in delta and wherein said groups of said direct current winding are connected in series and the series circuit, so formed, is connectable to a source of direct current.

8. The apparatus defined in claim 1, wherein said core, said primary winding, and said direct current winding are so chosen, with respect to each other, that the interlinked permeance of said direct current winding at core saturation, and the additional stray permeance interlinked with said primary winding make the fundamental oscillation of the primary flux, which is determined in value by the voltage of said mains applied to said primary winding, exceed the magnetic saturation limit in the region of the time intervals from approximately $\omega t_1$ to approximately $\omega t_2$, for a particular desired primary rated current and fundamental oscillation of the magnetic potential and, thus, for a certain bias magnetization and mean value of the magnetic potential, where $\omega t_1$ and $\omega t_2$ are given by $$(8u+1)\pi/4 \leq \omega t_1 \leq (8u+3)\pi/4,$$
$$(8u-1)\pi/4 \leq \omega t_2 \leq (8u+5)\pi/4$$

and $u=0, 1, 2, 3....$

9. The apparatus defined in claim 1, wherein the cores associated with said magnetic circuits have at least one airgap.

10. In combination: at least two apparatuses each as defined in claim 1 and being connected together for equalizing predetermined harmonics, the groups of said primary winding in each of said apparatuses being connected in the same manner.

11. The apparatus defined in claim 1, further comprising at least one supplementary winding means for distributing energy in the said apparatus whereby said apparatus simultaneously serves as a transformer.

12. The combination defined in claim 10, wherein said groups of said primary winding in each of said apparatuses are connected in star.

13. The combination defined in claim 10, wherein said groups of said primary winding in each of said apparatuses are connected in delta.

14. The combination defined in claim 10, wherein said groups of said primary winding in each of said apparatuses are connected in zigzag.

15. The apparatus as defined in claim 1 wherein said auxiliary winding means further includes a delta connected alternating current winding for influencing the harmonic content of the reactive current, said alternating current winding have $2n$ third windings which are serially connected in groups of two, each respective group being associated with a respective phase of said means.

16. The apparatus as defined in claim 15, wherein said two first windings in each group of said primary winding are connected in series, wherein said groups of said primary winding are connected in star, and wherein said groups of said direct current winding are connected in parallel, and the parallel circuit, so formed, is connectable to a source of direct current.

17. The apparatus defined in claim 15, wherein said two first windings in each group of said primary winding are connected in series, wherein said groups of said primary winding are connected in star, and wherein said groups of said direct current winding are connected in series, and the series circuit, so formed, is connectable to a source of direct current.

18 The apparatus defined in claim 15, wherein said two first windings in each group of said primary windings are connected in parallel, wherein said groups of said primary winding are connected in star, and wherein said groups of said direct current winding are connected in series, and the series circuit so formed, is connectable to a source of direct current.